United States Patent
Koide et al.

(10) Patent No.: US 10,571,015 B2
(45) Date of Patent: Feb. 25, 2020

(54) SHIFT CONTROL SYSTEM FOR INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Aichi-ken (JP); Yuichi Nishino, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 0 days.

(21) Appl. No.: 16/180,149

(22) Filed: Nov. 5, 2018

(65) Prior Publication Data
US 2019/0136966 A1    May 9, 2019

(30) Foreign Application Priority Data
Nov. 7, 2017 (JP) .................... 2017-214770

(51) Int. Cl.
*F16H 59/44* (2006.01)
*B60W 30/14* (2006.01)
(Continued)

(52) U.S. Cl.
CPC ............ *F16H 59/44* (2013.01); *B60K 6/543* (2013.01); *B60K 31/185* (2013.01);
(Continued)

(58) Field of Classification Search
CPC ............ F16H 59/44; F16H 2061/0072; F16H 2061/022; F16H 2061/163; F16H 61/0204; F16H 61/16
See application file for complete search history.

(56) References Cited

U.S. PATENT DOCUMENTS 5,806,009 A * 9/1998 Horiguchi ............ B60K 31/047
  477/120
6,030,315 A * 2/2000 Bellinger ................ F16H 61/16
  477/111

(Continued)

FOREIGN PATENT DOCUMENTS

JP    2003-041963 A    2/2003
JP    2008-138700 A    6/2008

OTHER PUBLICATIONS

Communication dated Mar. 18, 2019 by the Australian Patent Office in application No. 2018253568.

*Primary Examiner* — Edwin A Young
(74) *Attorney, Agent, or Firm* — Sughrue Mion, PLLC

(57) ABSTRACT

A shift control system for an industrial vehicle includes a vehicle speed monitor, a vehicle speed limit value setting section, a gear determination section, and a control section. The vehicle speed monitor is configured to monitor and detect an actual vehicle speed of the industrial vehicle. The vehicle speed limit value setting section is configured to set a vehicle speed limit value. The gear determination section is configured to select a transmission gear position of the transmission based on the actual vehicle speed and the vehicle speed limit value. The control section is configured to control the transmission in response to the selected transmission gear position. The gear determination section maintains the transmission in the currently-selected transmission gear position when the vehicle speed limit value is equal to or less than a predetermined threshold value and the threshold value is greater than an upshifting vehicle speed for upshifting the transmission.

4 Claims, 4 Drawing Sheets

(51) Int. Cl.
- *F16H 61/16* (2006.01)
- *F16H 59/46* (2006.01)
- *B60K 6/543* (2007.10)
- *B60K 31/18* (2006.01)
- *B60W 10/02* (2006.01)
- *B60W 20/30* (2016.01)
- *F16H 61/684* (2006.01)
- *B60K 31/00* (2006.01)
- *F16H 61/06* (2006.01)

(52) U.S. Cl.
CPC .......... *B60W 10/023* (2013.01); *B60W 20/30* (2013.01); *B60W 30/146* (2013.01); *F16H 59/46* (2013.01); *F16H 61/16* (2013.01); *B60K 2031/0091* (2013.01); *F16H 61/061* (2013.01); *F16H 61/684* (2013.01)

(56) References Cited

U.S. PATENT DOCUMENTS

| | | |
|---|---|---|
| 6,514,174 B2 | 2/2003 | Iida et al. |
| 2015/0239471 A1* | 8/2015 | Azuma ............... F16H 61/0213 701/54 |

\* cited by examiner

SHIFT CONTROL SYSTEM FOR INDUSTRIAL VEHICLE

BACKGROUND ART

The present disclosure relates to a shift control system for an industrial vehicle.

A shift control system for an industrial vehicle known in the art, for example, which is mentioned in Japanese Patent Application Publication No. 2008-138700, upshifts and downshifts a transmission according to vehicle speed of the industrial vehicle.

Industrial vehicles such as forklift trucks having a vehicle speed limiting function have been adopted widely so as not to break a speed limit in a work place by a driver. Recent vehicle speed limiting function of an industrial vehicle allows limiting vehicle speed in small increments, such as at 5 km/h or at 1 km/h. Generally, the maximum vehicle speed of a forklift truck is about 20 km/h, and the forklift truck needs to perform upshifting and downshifting at a vehicle speed within a range of vehicle speed in which setting vehicle speed limit is allowable. If a vehicle speed limit value is set near the upshifting vehicle speed that is an expected vehicle speed at which upshifting the transmission is performed, upshifting may be performed at an unexpected speed that is greater than the upshifting vehicle speed due to road slope or conditions, which causes variation in timing of upshifting. One way to solve such a problem is not to allow the vehicle speed limit value to be set near the upshifting vehicle speed. However, this way may narrow a range of vehicle speed in which setting vehicle speed limit value is allowable, and may prevent the user of the forklift truck for limiting the speed of the forklift truck at a desired vehicle speed.

The present disclosure is directed to providing a shift control system for an industrial vehicle, which reduces variation in timing of upshifting without narrowing a range of vehicle speed in which setting a vehicle speed limit value is allowable.

SUMMARY

In accordance with an aspect of the present disclosure, there is provided a shift control system for an industrial vehicle in which rotation of an engine is transmitted to a transmission to rotate wheels. The shift control system for the industrial vehicle includes a vehicle speed monitor, a vehicle speed limit value setting section, a gear determination section, and a control section. The vehicle speed monitor is configured to monitor and detect an actual vehicle speed of the industrial vehicle. The vehicle speed limit value setting section is configured to set a vehicle speed limit value of the industrial vehicle. The gear determination section is configured to select a transmission gear position of the transmission based on the actual vehicle speed and the vehicle speed limit value. The control section is configured to control the transmission in response to the transmission gear position selected by the gear determination section. The gear determination section does not upshift the transmission from the currently-selected transmission gear position and maintains the transmission in the currently-selected transmission gear position when the vehicle speed limit value is equal to or less than a predetermined threshold value for judging the vehicle speed limit value and the threshold value is greater than an upshifting vehicle speed that is a vehicle speed for upshifting the transmission from the currently-selected transmission gear position.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the embodiments together with the accompanying drawings in which.

DETAILED DESCRIPTION OF THE EMBODIMENTS

The following will describe an embodiment of the present disclosure with reference to FIGS. 1 through 4.

Figure 1:
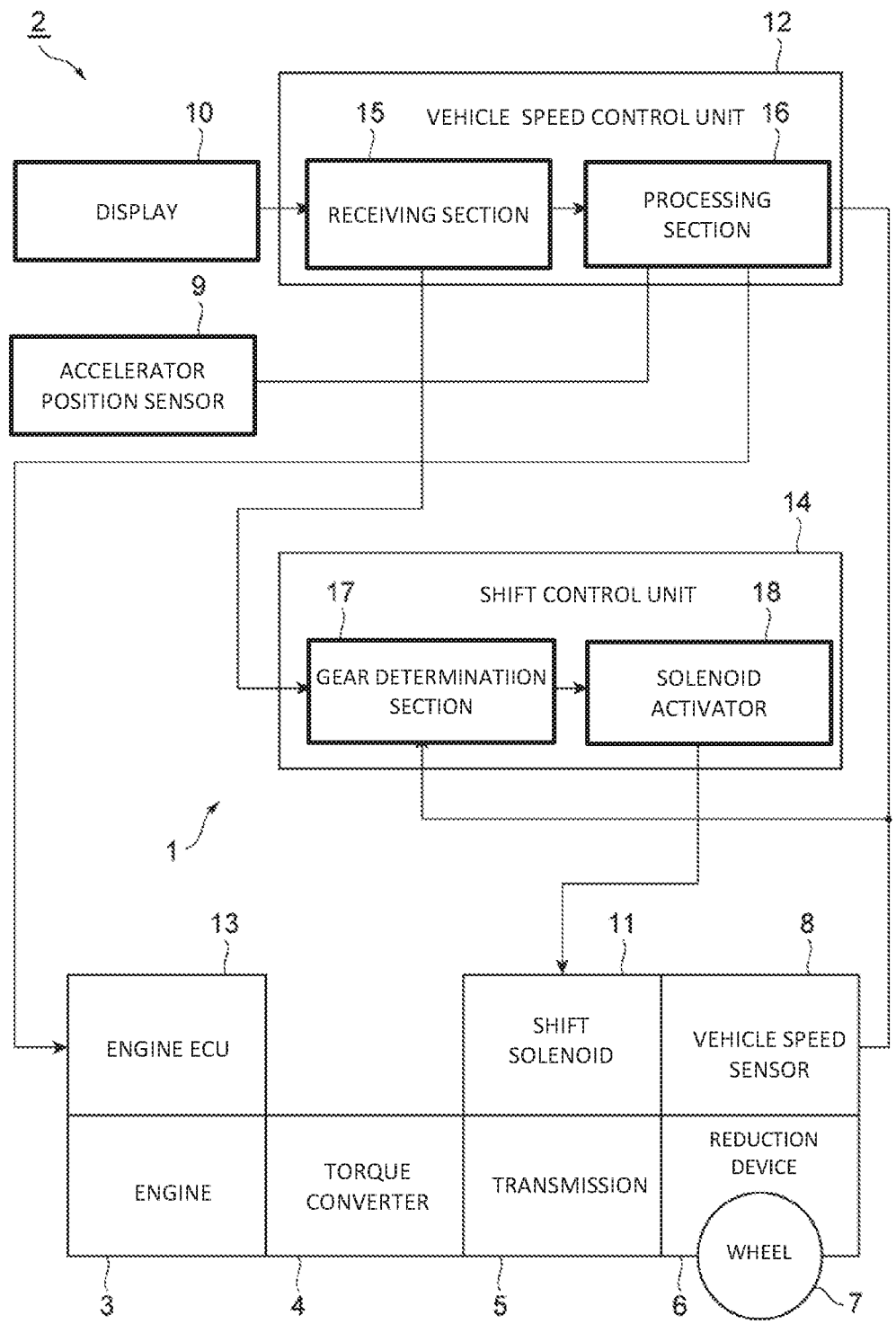
FIG. 1 is a schematic block diagram of an industrial vehicle including a shift control system, according to an embodiment of the present disclosure.

FIG. 1 is a schematic block diagram of an industrial vehicle including a shift control system according to an embodiment of the present disclosure. As shown in FIG. 1, a shift control system 1 is mounted in an industrial vehicle, which, in this embodiment, is an engine-powered forklift truck 2. The forklift truck 2 includes a vehicle speed limiting function and an automatic shifting function.

The forklift truck 2 includes an engine 3 and a transmission 5 connected to the engine 3 via a torque converter 4. The rotation of the engine 3 is transmitted to the transmission 5 via the torque converter 4. The transmission 5 is a two-speed transmission that includes a clutch and a plurality of gears.

The transmission 5 is connected to a pair of right and left wheels 7 via a reduction device 6 and an axle shaft (not shown). The rotation transmitted to the transmission 5 is transmitted to the wheels 7 via the reduction device 6 and the axle shaft to rotate the wheels 7, so that the forklift truck 2 travels.

The forklift truck 2 further includes a vehicle speed monitor (i.e., a vehicle speed sensor 8), an accelerator position sensor 9, a display 10, a shift solenoid 11, a vehicle speed control unit 12, an engine ECU 13, and a shift control unit 14.

The vehicle speed monitor, which, in this embodiment, is the vehicle speed sensor 8, is a sensor configured to monitor and detect the actual vehicle speed of the forklift truck 2. The accelerator position sensor 9 is a sensor configured to monitor and detect the accelerator position of the forklift truck 2. The driver of the forklift truck 2 inputs setting data on the forklift truck 2 to the display 10. The display 10 displays information on the forklift truck 2.

Figure 3:
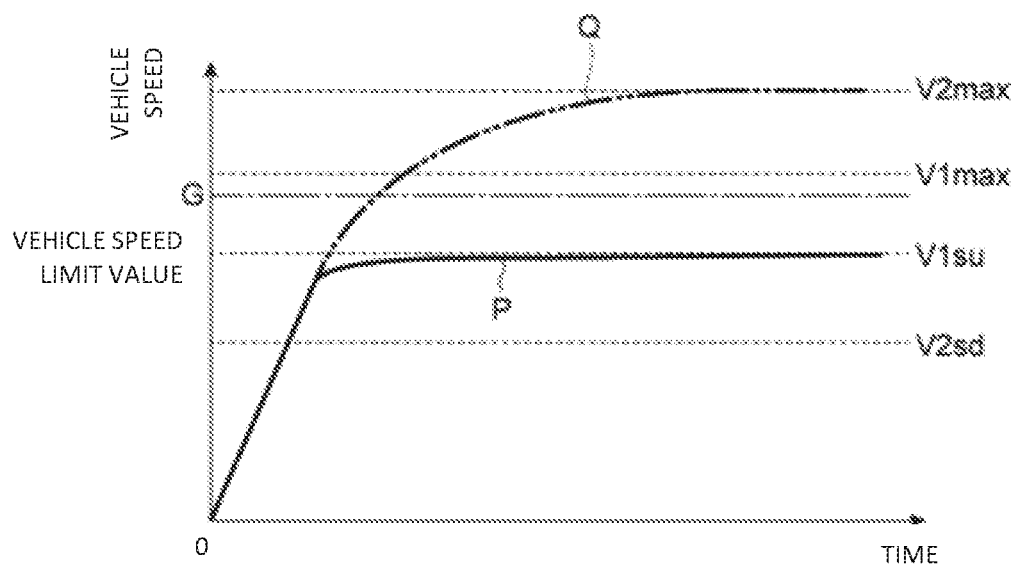
FIG. 3 is a graph of showing an example of acceleration of the industrial vehicle of FIG. 1 with a vehicle speed limit value set by a vehicle speed limit value setting section of the shift control system.

The data that is input to the display 10 includes data to enable or disable a limitation of the vehicle speed of the forklift truck 2, and to set or change a vehicle speed limit value. The vehicle speed limit value is a limit value to limit the speed of the forklift truck 2 (FIG. 3). When the vehicle speed limitation is enabled and a vehicle speed limit value is set, the vehicle speed of the forklift truck 2 is limited to the vehicle speed limit value. The vehicle speed limit value can be selectively set in increments of 1 km/h, for example, between 5 km/h and around 20 km/h. Enablement/disablement of the vehicle speed limitation and setting/change of the vehicle speed limit value can be performed while the forklift truck 2 is travelling.

The shift solenoid 11 shifts the transmission 5 between first gear and second gear. For example, the shift solenoid 11 may control engagement of a clutch of the transmission 5.

Each of the vehicle speed control unit 12, the engine ECU 13, and the shift control unit 14 includes CPU, RAM, ROM, and input-output interface. The vehicle speed control unit 12, the engine ECU 13, and the shift control unit 14 may cooperate to form a single controller.

The vehicle speed control unit 12 includes a receiving section 15 and a processing section 16. The receiving section 15 is configured to receive the vehicle speed limit value sent from the display 10. The display 10 and the receiving section 15 cooperate to serve as a vehicle speed limit value setting section that is configured to set the vehicle speed limit value of the forklift truck 2. The vehicle speed limit value setting section has a function to enable and disable a limitation of the vehicle speed of the forklift truck 2.

The processing section 16 is configured to calculate engine control command values using the actual vehicle speed, the accelerator position and the vehicle speed limit value of the forklift truck 2. The actual vehicle speed and the accelerator position are respectively monitored and detected by the vehicle speed sensor 8 and the accelerator position sensor 9. The vehicle speed limit value is received by the receiving section 15. The engine control command values include, for example, engine RPM and engine torque that are necessary to match the actual vehicle speed of the forklift truck 2 to the lower one of the target vehicle speed depending on the accelerator position and the target vehicle speed depending on the vehicle speed limit value.

The engine ECU 13 controls the engine 3 using the engine control command values calculated by the processing section 16.

The shift control unit 14 includes a gear determination section 17 and a solenoid activator 18. The gear determination section 17 is configured to select a transmission gear position of the transmission 5 (i.e., first gear or second gear) based on the actual vehicle speed of the forklift truck 2 that is monitored and detected by the vehicle speed sensor 8 and the vehicle speed limit value that is received by the receiving section 15. Processing of the gear determination section 17 is described later. The solenoid activator 18 activates the shift solenoid 11 in response to the transmission gear position selected by the gear determination section 17.

The shift control system 1 according to the present embodiment includes the vehicle speed sensor 8, the display 10, the shift solenoid 11, the receiving section 15 of the vehicle speed control unit 12, and the shift control unit 14. The solenoid activator 18 of the shift control unit 14 and the shift solenoid 11 cooperate to serve as a control section configured to control the transmission 5 in response to the transmission gear position selected by the gear determination section 17.

Figure 2:
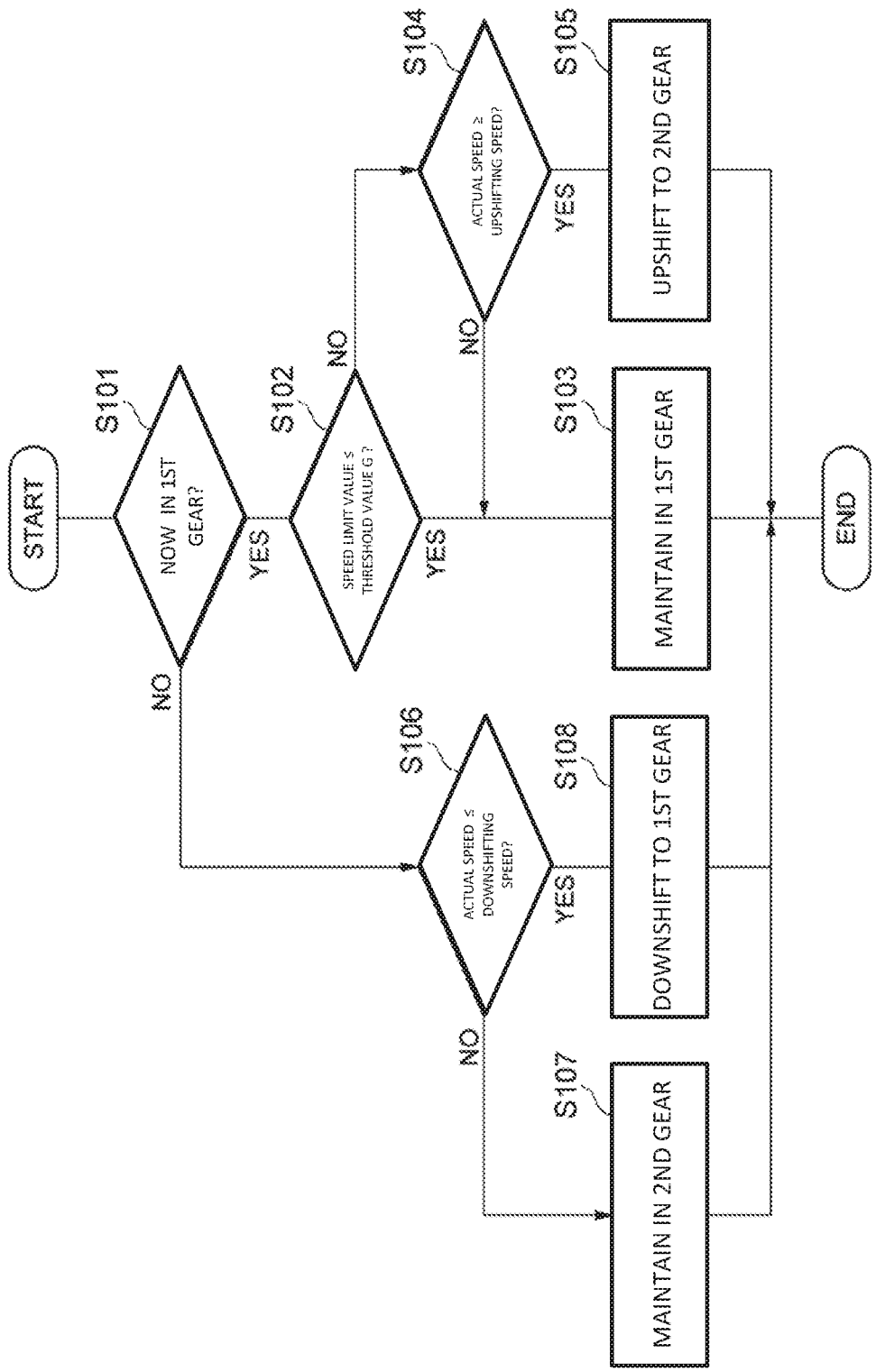
FIG. 2 is a flowchart of the processing of transmission gear position selection performed by a gear determination section shown in FIG. 1.

FIG. 2 is a flowchart of the processing of transmission gear position selection performed by the gear determination section 17. As shown in FIG. 2, firstly, in a step S101, the gear determination section 17 judges whether the transmission 5 is now in first gear, based on information on the currently-selected gear position stored in the gear determination section 17. In other words, the gear determination section 17 judges whether the currently-selected transmission gear position is first gear. Although the currently-selected transmission gear position information is stored in the gear determination section 17, this may be stored in a sensor possibly disposed in the transmission 5 to monitor and detect the current transmission gear position.

When the currently-selected transmission gear position is first gear, the gear determination section 17 judges whether the vehicle speed limit value received by the receiving section 15 is equal to or less than a predetermined threshold value G for judging the vehicle speed limit value, in a step S102. As shown in FIG. 3, the threshold value G is greater than an upshifting vehicle speed $V1su$ when the transmission 5 is in first gear, which is a vehicle speed for upshifting the transmission 5 from first gear the currently-selected transmission gear position), and is less than a maximum vehicle speed V1max in first gear currently-selected transmission gear position), which is the maximum vehicle speed when the currently-selected transmission gear position is first gear. In other words, the threshold value G is greater than an upshifting vehicle speed $V1su$ for upshifting the transmission 5 from the currently-selected transmission gear position and is less than the maximum vehicle speed V1max in the currently-selected transmission gear position.

FIG. 3 is a graph showing an example of acceleration of the forklift truck 2 with a vehicle speed limit value set by the vehicle speed limit value setting section. As shown in FIG. 3, the horizontal axis represents time, and the vertical axis represents vehicle speed of the forklift truck 2. When the vehicle speed limit value that is less than the threshold value G is set, the vehicle speed of the forklift truck 2 is limited to the vehicle speed limit value during acceleration of the forklift truck 2, as indicated by a solid line P in FIG. 3. When the vehicle speed limit value is not set, the forklift truck 2 is accelerated without vehicle speed limitation, as indicated by a chain double-dashed line Q.

The upshifting vehicle speed $V1su$ when the currently-selected transmission gear position is first gear is, basically, a vehicle speed of the forklift truck 2 at which the transmission 5 is upshifted from first gear to second gear during acceleration. When the vehicle speed of the forklift truck 2 is less than the upshifting vehicle speed $V1su$ during acceleration, the currently-selected transmission gear position is first gear. When the vehicle speed of the forklift truck 2 is equal to or greater than the upshifting vehicle speed $V1su$, the currently-selected transmission gear position is basically second gear. The maximum vehicle speed V1max in first gear is less than a maximum vehicle speed V2max in second gear. The maximum vehicle speed V2max in second gear is a vehicle speed of the forklift truck 2 when the currently-selected transmission gear position is second gear. The maximum vehicle speed V1max and the maximum vehicle speed V2max are determined, for example, by the gear ratio between the engine 3 and the transmission 5, and vary by type of vehicle. The threshold value G may be determined according to the specifications and behaviors of the forklift truck 2.

In the step S102 in FIG. 2, when the vehicle speed limit value is equal to or less than the threshold value G referring to FIG. 3, the gear determination section 17 determines the maintenance of the transmission 5 in first gear and instructs the solenoid activator 18 to maintain the transmission 5 in first gear, in a step S103. That is, the gear determination section 17 does not upshift the transmission 5 from the currently-selected transmission gear position and maintains the transmission 5 in the currently-selected transmission gear position when the vehicle speed limit value is equal to or less than the threshold value G.

When the vehicle speed limit value is greater than the threshold value G in the step S102, the gear determination section 17 judges whether the actual vehicle speed monitored and detected by the vehicle speed sensor 8 is equal to or greater than the upshifting vehicle speed V1*su*, in a step S104.

When the actual vehicle speed is less than the upshifting vehicle speed V1*su* in the step S104, the gear determination section 17 determines the maintenance of the transmission 5 in first gear and instructs the solenoid activator 18 to maintain the transmission 5 in first gear in the step S103. When the actual vehicle speed is equal to or greater than the upshifting vehicle speed V1*su* in the step S104, the gear determination section 17 determines to upshift the transmission 5 from first gear to second gear and instructs the solenoid activator 18 to upshift the transmission 5 from first gear to second gear, in a step S105. That is, the gear determination section 17 upshifts the transmission 5 when the actual vehicle speed is equal to or greater than the upshifting vehicle speed V1*su*.

When the transmission 5 is now in second gear in the step S101, the gear determination section 17 judges whether the actual vehicle speed monitored and detected by the vehicle speed sensor 8 is equal to or less than a downshifting vehicle speed V2*sd*, which is a vehicle speed for downshifting the transmission 5 from second gear (i.e., the currently-selected transmission gear position) to first gear, in a step S106.

The downshifting vehicle speed V2*sd* when the currently-selected transmission gear position is second gear, which is shown in FIG. 3, is a vehicle speed of the forklift truck 2 at which the transmission 5 is downshifted from second gear to first gear during deceleration. That is, when the vehicle speed of the forklift truck 2 is greater than the downshifting vehicle speed V2*sd* during deceleration, the currently-selected transmission gear position is second gear. When the vehicle speed of the forklift truck 2 is equal to or less than the downshifting vehicle speed V2*sd* during deceleration, the currently-selected transmission gear position is first gear.

When the actual vehicle speed is greater than the downshifting vehicle speed V2*sd* in the step S106, the gear determination section 17 determines the maintenance of the transmission 5 in second gear and instructs the solenoid activator 18 to maintain the transmission 5 in second gear, in a step S107. When the actual vehicle speed is equal to or less than the downshifting vehicle speed V2*sd* in the step 106, the gear determination section 17 determines to downshift the transmission 5 from second gear to first gear and instructs the solenoid activator 18 to downshift the transmission 5 from second gear to first gear, in a step S108. That is, the gear determination section 17 downshifts the transmission 5 when the actual vehicle speed is equal to or less than the downshifting vehicle speed V2*sd*.

Figure 4A:
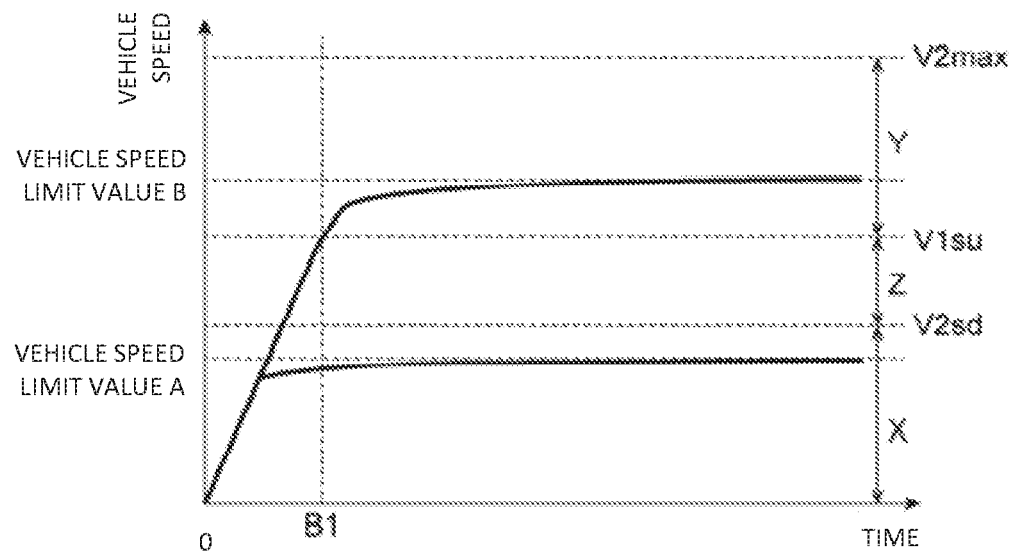
FIGS. 4A and 4B are graphs of showing an example of acceleration of the industrial vehicle with a vehicle speed limit value set by a vehicle speed limit value setting section of the shift control system known in the art.
Figure 4B:
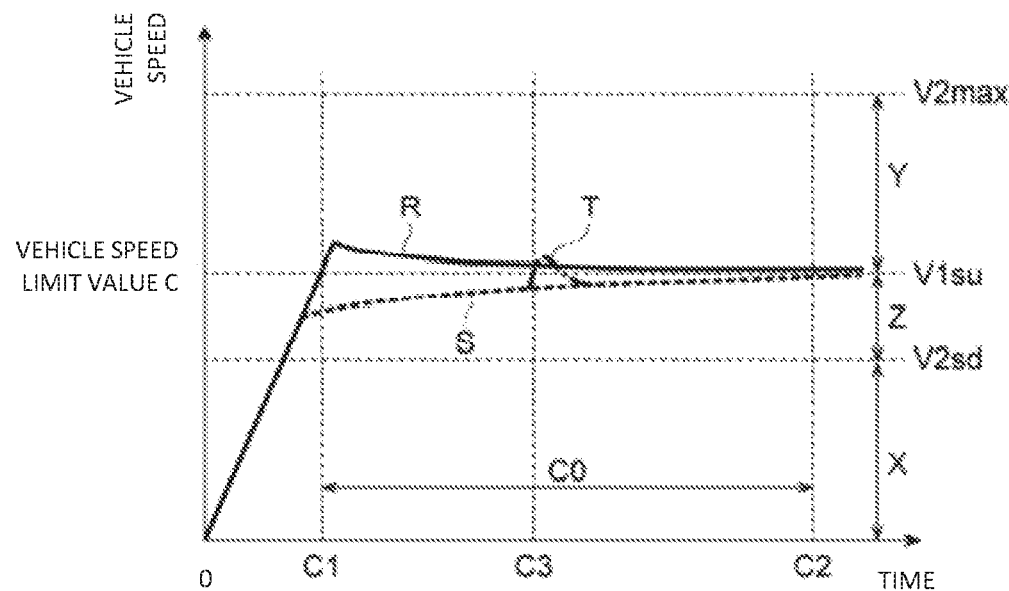

FIGS. 4A and 4B are graphs of showing an example of acceleration of the forklift truck 2 with a vehicle speed limit value set by a vehicle speed limit value setting section of the shift control system known in the art. In FIGS. 4A and 4B, the horizontal axis and the vertical axis represent respectively time and vehicle speed. A range X of vehicle speed from zero to the downshifting vehicle speed V2*sd* is a vehicle speed range where the forklift truck 2 including the known shift control system travels in first gear. A range Y of vehicle speed from the upshifting vehicle speed V1*su* to the maximum vehicle speed V2max is a vehicle speed range where the forklift truck 2 including the known shift control system travels in second gear. A range Z of vehicle speed from the downshifting vehicle speed V2*sd* to the upshifting vehicle speed V1*su* is a vehicle speed range where the forklift truck 2 including the known shift control system travels in first gear during acceleration and travels in second gear during deceleration.

As shown in FIG. 4A, when a vehicle speed limit value A is set within the range X, the vehicle speed of the forklift truck 2 is capped by the vehicle speed limit value A in a state that the currently-selected transmission gear position is first gear, and the forklift truck 2 travels at a constant speed according to the vehicle speed limit value A. In this case, the transmission 5 is not upshifted from first gear to second gear, so that the driver can drive without feeling a shock caused by upshifting. When a vehicle speed limit value B is set within the range Y, the vehicle speed of the forklift truck 2 is capped by the vehicle speed limit value B in a state that the currently-selected transmission gear position is second gear. In this case, the transmission 5 is upshifted at the same timing as in case that the vehicle speed limit value is not set or enabled, so that the driver does not experience a feeling of strangeness caused by an unexpected shift shock. The timing of upshifting is indicated by the dotted line B1 in FIG. 4A.

In FIG. 4B, a vehicle speed limit value C is set in such a manner as to approximately correspond to the upshifting vehicle speed V1*su*. This may cause upshifting to occur at a vehicle speed that is greater than the upshifting vehicle speed due to road slope, road conditions, or load on the industrial vehicle, thereby varying the upshifting timing.

Specifically, when the forklift truck 2 travels down a slope, the forklift truck 2 is accelerated due to load or vehicle weight. As indicated by the solid line R, in this case, the vehicle speed of the forklift truck 2 exceeds the upshifting vehicle speed V1*su* once, and then becomes constant. While the forklift truck 2 is traveling down a slope, upshifting is performed at a timing indicated by the dotted line C1 in FIG. 4B. The forklift truck 2 is less accelerated when traveling up a slope than when traveling down a slope or on a flat road. Thus, when the forklift truck 2 travels up a slope, the vehicle speed of the forklift truck 2 becomes constant before reaching the upshifting vehicle speed V1*su*, as indicated by a broken line S. While the forklift truck 2 is traveling up a slope, upshifting is performed at a timing indicated by the dotted line C2 in FIG. 4B. Accordingly, there is a time difference of C0 (=C2−C1) in timing of upshifting.

For example, when the forklift truck 2 travels up a rough slope, the vehicle speed of the forklift truck 2 may increase temporally, and may reach or exceed the upshifting vehicle speed V1*su*, as indicated by the chain line T. In this case, upshifting is performed at a timing indicated by the dotted line C3 in FIG. 4B. This may cause a shift shock when the driver is about to drive the forklift truck 2 at a constant speed according to the vehicle speed limit value C, so that this may worsen operation of the driver.

When a vehicle speed limit value is set slightly below the upshifting vehicle speed V1*su*, upshifting may be performed suddenly and unexpectedly due to a rough road while the forklift truck 2 is traveling at a constant speed according to the vehicle speed limit value. This may cause an unexpected shift shock by upshifting, so that this may worsen operation of the driver or give the driver a feeling of strangeness.

One way to solve such problems is to functionally disable setting of the vehicle speed limit value near the upshifting vehicle speed V1*su*. However, this way narrows a range of vehicle speed in which setting a vehicle speed limit value is allowable, and may prevent the user of the forklift truck 2 for setting the vehicle speed limit near the upshifting vehicle speed V1$su$ if necessary.

In the transmission 5 of this embodiment, the transmission 5 is not upshifted and maintained in the currently-selected transmission gear position when the vehicle speed limit value of the forklift truck 2 is equal to or less than the threshold value G. Specifically, in a state that the currently-selected transmission gear position is first gear, the transmission 5 is not upshifted to second gear and is maintained in first gear when the vehicle speed limit value of the forklift truck 2 is equal to or less than the threshold value G. The threshold value G is greater than the upshifting vehicle speed V1$su$ for upshifting the transmission 5 from the currently-selected transmission gear position. When the vehicle speed limit value of the forklift truck 2 is set near the upshifting vehicle speed V1$su$, the vehicle speed of the forklift truck 2 may exceed the upshifting vehicle speed V1$su$ due to road slope or road condition. However, in the embodiment according to the present disclosure, the transmission 5 is not upshifted at the upshifting vehicle speed V1$su$ and is maintained in the currently-selected transmission gear position. Accordingly, this embodiment reduces variation in timing of upshifting without narrowing a range of the vehicle speed in which setting a vehicle speed limit value is allowable. Further, this eliminates or minimizes occurrence of a shift shock by upshifting during traveling of the forklift truck 2 at a constant speed, thereby eliminating or minimizing worsening of operation of the driver.

In this embodiment, the gear determination section 17 upshifts the transmission 5 when the vehicle speed limit value is greater than the threshold value G and the actual vehicle speed is equal to or greater than the upshifting vehicle speed V1$su$ for upshifting the transmission 5 from the currently-selected transmission gear position. When the vehicle speed limit value is greater than the threshold value G, the vehicle speed limit value is greater than the upshifting vehicle speed V1$su$. Accordingly, upshifting the transmission 5 brings the vehicle speed of the forklift truck 2 close to the vehicle speed limit value.

In this embodiment, the threshold value G is greater than the upshifting vehicle speed V1$su$ for upshifting the transmission 5 from the currently-selected transmission gear position and is less than the maximum vehicle speed V1max in the currently-selected transmission gear position. Accordingly, upshifting the transmission 5 brings the vehicle speed of the forklift truck 2 close to the vehicle speed limit value reliably even if the vehicle speed limit value is set equal to or greater than the maximum vehicle speed V1max in the currently-selected transmission gear position.

In this embodiment, the gear determination section 17 downshifts the transmission 5 when the actual vehicle speed is equal to or less than the downshifting vehicle speed V2$sd$ from the currently-selected transmission gear position. For example, even if the vehicle speed limit is enabled during travelling of the forklift truck 2, the transmission 5 is not downshifted unless the actual vehicle speed is equal to or less than the downshifting vehicle speed V2$sd$. Specifically, if the vehicle speed limit is enabled while the forklift truck 2 is travelling in second gear, the transmission 5 is not downshifted to first gear unless the actual vehicle speed is equal to or less than the downshifting vehicle speed V2$sd$. This eliminates or minimizes sudden downshifting from second gear to first gear.

The present disclosure is not limited to the above-described embodiment. For example, although the transmission 5 is a two-speed transmission in the embodiment of the present disclosure, the transmission 5 may have three or more speed-settings.

For example, the transmission 5 may be a three-speed transmission. This transmission 5 is not upshifted from second gear to third gear and is maintained in second gear when a vehicle speed limit value is set equal to or less than a threshold value that is greater than an upshifting vehicle speed for upshifting the transmission 5 from second gear to third gear. When the vehicle speed limit value is greater than the threshold value and an actual vehicle speed of the forklift truck 2 is equal to or greater than the upshifting vehicle speed, the transmission 5 is upshifted from second gear to third gear. When the actual vehicle speed is equal to or less than a downshifting vehicle speed for downshifting the transmission 5 from third gear to second gear, the transmission 5 is downshifted to second gear.

In the above-described embodiment, the threshold value G is greater than an upshifting vehicle speed for upshifting the transmission 5 from the currently-selected transmission gear position, and is less than a maximum vehicle speed in the currently-selected transmission gear position. The threshold value G is not limited to the embodiment as long as the threshold value G is greater than the upshifting vehicle speed for upshifting the transmission 5 from the currently-selected transmission gear position.

The shift control system 1 according to the above described embodiment of the present disclosure is mounted in the engine-powered forklift truck 2. However, this present disclosure is applicable to any industrial vehicle in which the rotation of an engine is transmitted to a transmission to rotate wheels. Such industrial vehicles include towing vehicles and construction vehicles.

What is claimed is:

1. A shift control system for an industrial vehicle in which rotation of an engine is transmitted to a transmission to rotate wheels, comprising:
   a vehicle speed monitor configured to monitor and detect an actual vehicle speed of the industrial vehicle;
   a vehicle speed limit value setting section configured to set a vehicle speed limit value of the industrial vehicle;
   a gear determination section configured to select a transmission gear position of the transmission based on the actual vehicle speed and the vehicle speed limit value; and
   a control section configured to control the transmission in response to the transmission gear position selected by the gear determination section, wherein
   the gear determination section does not upshift the transmission from the currently-selected transmission gear position and maintains the transmission in the currently-selected transmission gear position when the vehicle speed limit value is equal to or less than a predetermined threshold value for judging the vehicle speed limit value and the threshold value is greater than an upshifting vehicle speed that is a vehicle speed for upshifting the transmission from the currently-selected transmission gear position.

2. The shift control system for the industrial vehicle according to claim 1, wherein the gear determination section upshifts the transmission when the vehicle speed limit value is greater than the threshold value and the actual vehicle speed is equal to or greater than the upshifting vehicle speed.

3. The shift control system for the industrial vehicle according to claim 2, wherein the threshold value is greater than the upshifting vehicle speed and is less than a maximum vehicle speed in the currently-selected transmission gear position.

4. The shift control system for the industrial vehicle according to claim 2, wherein
   the vehicle speed limit value setting section has a function to enable and disable a limitation of the vehicle speed of the industrial vehicle, and
   the gear determination section downshifts the transmission when the actual vehicle speed is equal to or less than a downshifting vehicle speed that is a vehicle speed for downshifting the transmission from the currently-selected transmission gear position.

* * * * *